United States Patent [19]
Cicconi

[11] Patent Number: 5,389,253
[45] Date of Patent: Feb. 14, 1995

[54] FUNNELS FOR USE WITH LARGE DRUMS

[76] Inventor: Michael G. Cicconi, 3650 Tuscarawas Rd., Beaver, Pa. 15009

[21] Appl. No.: 149,515

[22] Filed: Nov. 9, 1993

[51] Int. Cl.$^6$ ............... B01D 29/085; B65B 39/00
[52] U.S. Cl. ................................. 210/248; 210/473; 210/477; 141/331
[58] Field of Search .......... 210/248, 473, 474, 483; 141/331-335

[56] References Cited

U.S. PATENT DOCUMENTS

| Re. 6,614 | 8/1875 | Heermance et al. | 210/473 |
|---|---|---|---|
| 132,963 | 11/1872 | Heermance et al. | 210/473 |
| 453,798 | 6/1891 | Gersdorff | 210/477 |
| 559,905 | 5/1896 | Pike | 210/477 |
| 986,301 | 3/1911 | Michel | 210/477 |
| 4,559,984 | 12/1985 | Wycech | 141/340 |
| 4,703,867 | 11/1987 | Schoenhard | 141/98 |
| 4,823,848 | 4/1989 | Sentmore, Sr. et al. | 141/334 |
| 4,856,568 | 8/1989 | Murphy et al. | 141/337 |
| 5,018,559 | 5/1991 | Branan | 141/339 |

*Primary Examiner*—Robert A. Dawson
*Assistant Examiner*—Robert James Popovics
*Attorney, Agent, or Firm*—Hugh E. Smith

[57] ABSTRACT

Apparatus for pouring used fuel and other fluids into a large container comprising a funnel fabricated of a rigid material and having a lower extent of a cylindrical configuration with a small diameter and a limited height with external threads thereon, an upper extent of a cylindrical configuration with a large diameter and a limited height, and an intermediate extent of a frustoconical configuration extending between the upper extent and the lower extent, the upper and intermediate and lower extents having a common axis with the surface of the intermediate extent forming an angle of between about 20 and 40 degrees with respect to the axis.

2 Claims, 4 Drawing Sheets

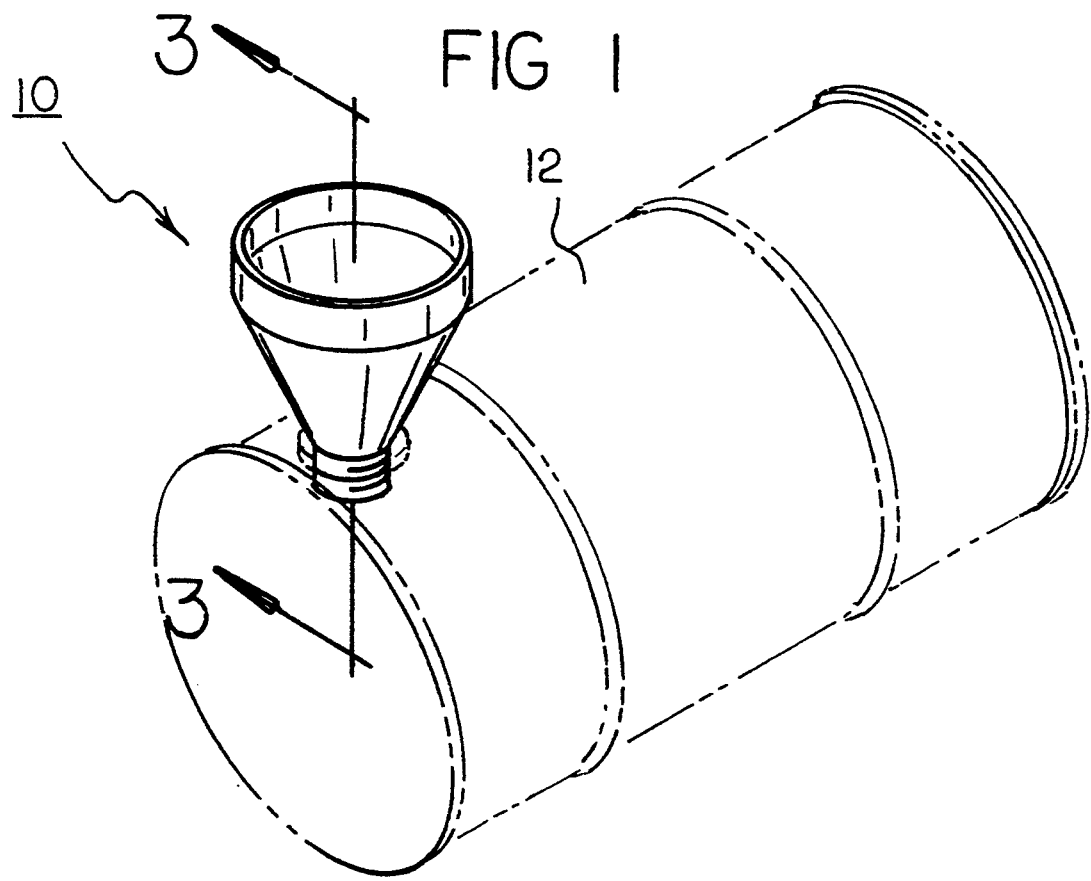
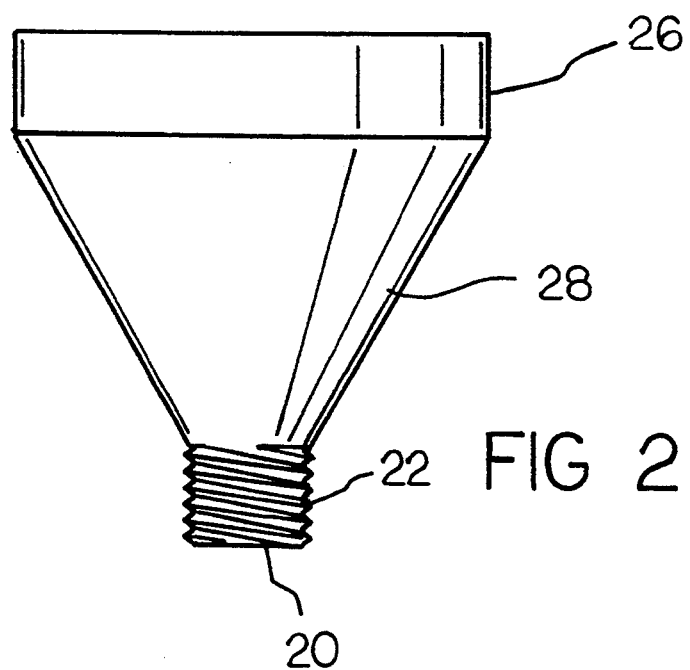

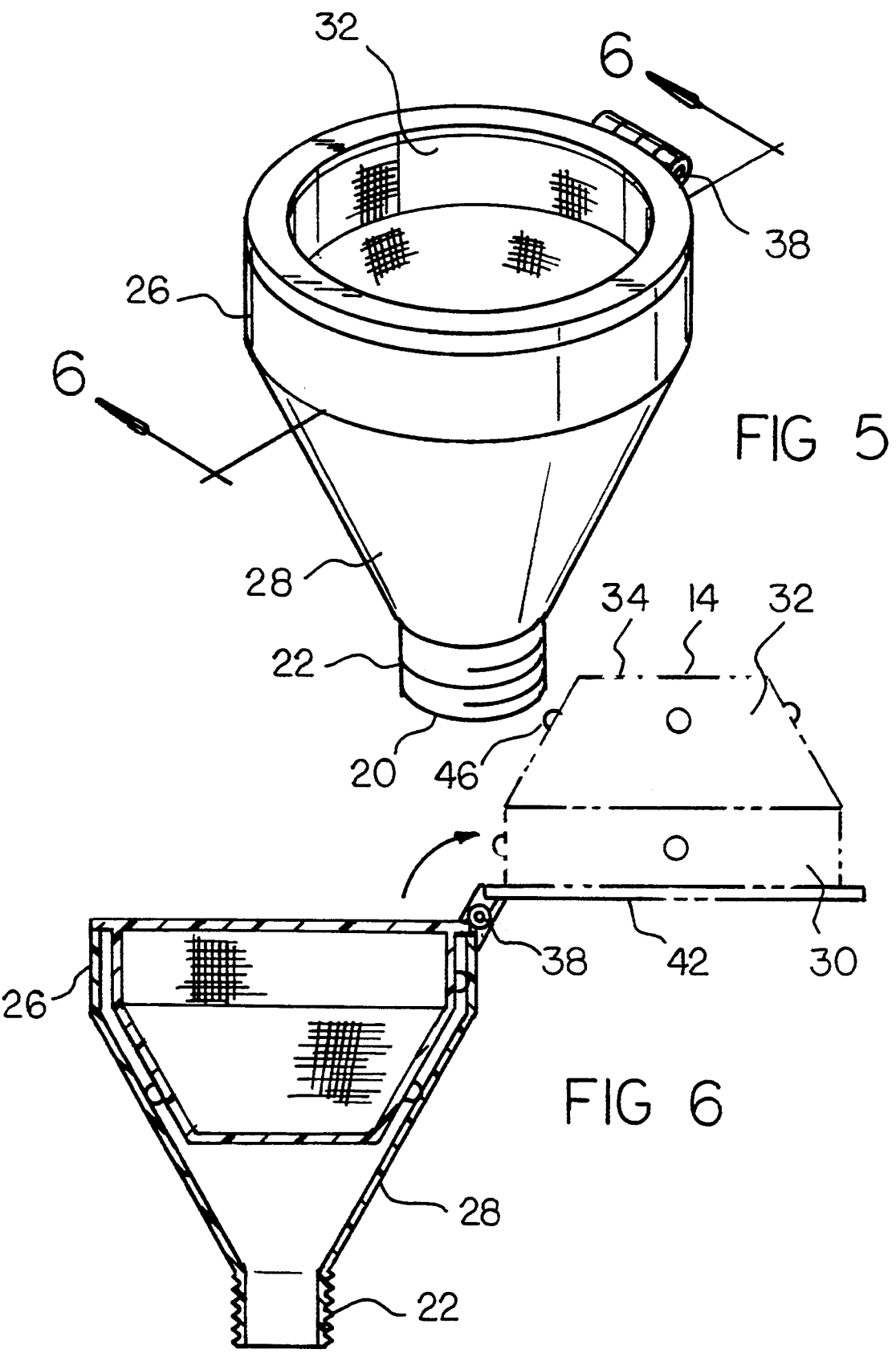

FUNNELS FOR USE WITH LARGE DRUMS

BACKGROUND OF THE INVENTION

1. Field of the Invention

The present invention relates to funnels for use with large drums and more particularly pertains to filling large drums through a funnel.

2. Description of the Prior Art

The use of funnels is known in the prior art. More specifically, funnels heretofore devised and utilized for the purpose of pouring fluids are known to consist basically of familiar, expected, and obvious structural configurations, notwithstanding the myriad of designs encompassed by the crowded prior art which has been developed for the fulfillment of countless objectives and requirements.

The prior art discloses a large number of funnels and associated components. By way of example, U.S. Pat. No. 4,559,984 to Wycech; U.S. Pat. No. 4,823,848 to Sentmore and U.S. Pat. No. 4,856,568 to Murphy all disclose funnels with coupling components at their lower ends. Wycech employs external threads. Sentmore employs internal threads. Murphy discloses a supplemental component therebeneath.

U.S. Pat. No. 4,703,867 discloses an oil filler funnel and cap adapted for use in association with an automobile.

In addition, U.S. Pat. No. 5,018,559 to Branan discloses a large funnel positionable over a 55 gallon drum.

In this respect, the funnels for use with large drums according to the present invention substantially departs from the conventional concepts and designs of the prior art, and in doing so provides an apparatus primarily developed for the purpose of filling large drums through a funnel.

Therefore, it can be appreciated that there exists a continuing need for new and improved funnels for use with large drums which can be used for filling large drums through a funnel. In this regard, the present invention substantially fulfills this need.

SUMMARY OF THE INVENTION

In view of the foregoing disadvantages inherent in the known types of funnels now present in the prior art, the present invention provides improved funnels for use with large drums. As such, the general purpose of the present invention, which will be described subsequently in greater detail, is to provide a new and improved funnel for use with large drums and method which has all the advantages of the prior art and none of the disadvantages.

To attain this, the present invention essentially comprises a new and improved apparatus for pouring oil and other fluids into a large container comprising, in combination, a funnel fabricated of a rigid material and having a lower extent of a cylindrical configuration with a small diameter and a limited height with external threads thereon, an upper extent of a cylindrical configuration with a large diameter and a limited height, and an intermediate extent of a frustroconical configuration extending between the upper extent and the lower extent, the upper and intermediate and lower extents having a common axis with the surface of the intermediate extent forming an angle of about 30 degrees with respect to the axis; a strainer having a cylindrical upper wall positionable within the upper extent of the funnel and a frustroconical lower wall located within the upper portion of the intermediate extent of the funnel and a circular wall therebeneath and a hinge coupling the upper edge of the strainer to the upper edge of the funnel, the wall being fabricated of a mesh material; and a catch basin removably positionable adjacent to the exterior surface of the funnel adjacent to its upper edge whereby the pivoting of the sieve out of the funnel will deposit debris therefrom into the catch basin.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved funnels for use with large drums which have all the advantages of the prior art funnels and none of the disadvantages.

It is another object of the present invention to provide new and improved funnels for use with large drums which may be easily and efficiently manufactured and marketed.

It is a further object of the present invention to provide new and improved funnels for use with large drums which are of durable and reliable constructions.

An even further object of the present invention is to provide new and improved funnels for use with large drums which are susceptible of a low cost of manufacture with regard to both materials and labor, and which accordingly are then susceptible of low prices of sale to the consuming public, thereby making such funnels for use with large drums economically available to the buying public.

Still yet another object of the present invention is to provide new and improved funnels for use with large drums which provide in the apparatuses and methods of the prior art some of the advantages thereof, while simultaneously overcoming some of the disadvantages normally associated therewith.

Even still another object of the present invention is to fill large drums through a funnel more efficiently and conveniently.

Lastly, it is an object of the present invention to provide a new and improved apparatus for pouring used fuel and other fluids into a large container comprising a funnel fabricated of a rigid material and having a lower extent of a cylindrical configuration with a small diameter and a limited height with external threads thereon, an upper extent of a cylindrical configuration with a large diameter and a limited height, and an intermediate extent of a frustroconical configuration extending between the upper extent and the lower extent, the upper and intermediate and lower extents having a common axis with the surface of the intermediate extent forming an angle of between about 20 and 40 degrees with respect to the axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a filter for use with large drums constructed in accordance with the principles of the present invention.

FIG. 2 is a front elevational view of the filter shown in FIG. 1.

FIG. 5 is a perspective view of a filter for use with large drums constructed in accordance with an alternate embodiment of the invention.

FIG. 6 is a sectional view of the filter of the prior Figure taken along line 6—6 of FIG. 5.

The same reference numerals refer to the same parts throughout the various Figures.

DESCRIPTION OF THE PREFERRED EMBODIMENT

Figure 3:
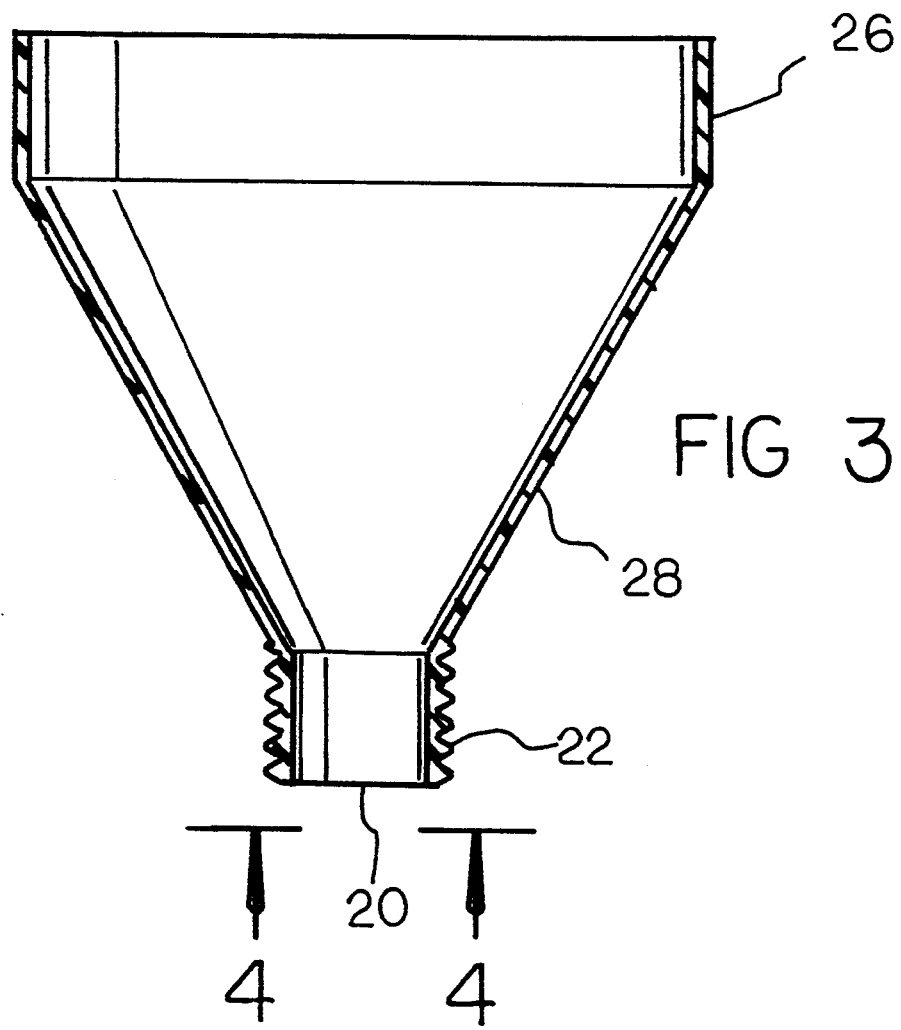
FIG. 3 is a sectional view of the filter of the prior Figures taken along line 3—3 of FIG. 1.
Figure 4:
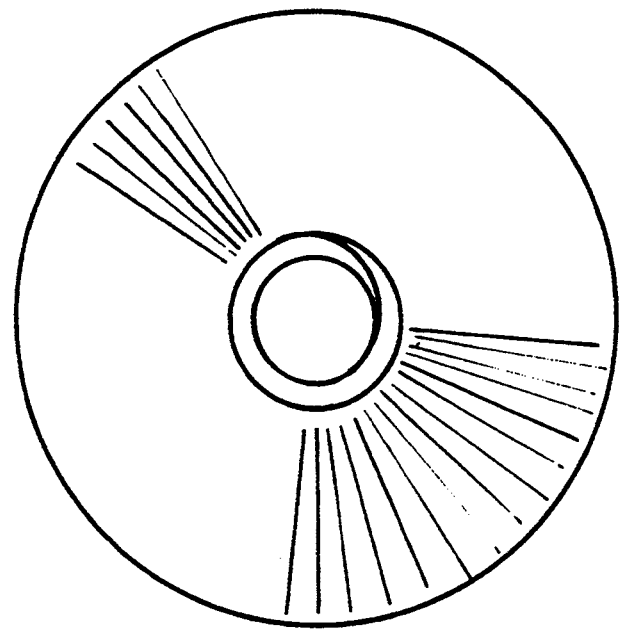
FIG. 4 is a bottom view of the filter taken along line 4—4 of FIG. 3.

With reference now to the drawings, and in particular to FIG. 1 thereof, the preferred embodiment of the new and improved funnels for use with large drums embodying the principles and concepts of the present invention and generally designated by the reference numeral 10 will be described.

More specifically, the present invention of the instant application is in an apparatus which takes the form of a funnel 10. Its function is for pouring oil and other fluids into a large container 12. The invention in its broadest context may be considered as including three components: a funnel 10, a strainer 14 and a catch basin 16.

The funnel 10 is fabricated of a rigid material as for example, plastic or galvanized steel. It is formed with a lower extent 20. The lower extent has a small diameter and is of a limited height. The lower extent is formed with external threads 22 to allow removable coupling with corresponding threads in the container 12.

The funnel 10 also has an upper extent 26. The upper extent, like the lower extent, is also of a cylindrical configuration. It is, however, of a large diameter but, again like the lower extent, it is of a limited height.

An intermediate extent 28 of the funnel extends between and couples the upper extent and the lower extent. The upper and intermediate and lower extents have a common axis which is critical during use.

The axis is of the funnel is located at preferably thirty degrees with respect to the surface of the intermediate extent. Such angle may, however, be between about twenty and forty degrees.

As shown in FIGS. 5 and 6, an alternate embodiment of the invention, the next component of the invention is the strainer 14. The strainer has a cylindrical upper side wall 30 which, during use, is positioned within the upper extent of the funnel. The strainer also has a frustroconical lower side wall 32 which, during use, is located within the upper portion of the intermediate extent of the funnel. The strainer also includes a horizontal circular bottom wall 34 beneath the lower side wall 32. The walls of the container fabricated of any conventional mesh material to filter out particulate material in the fluid poured therethrough.

In association with the strainer, a hinge 38 is provided for rotatably coupling the strainer at one edge to the upper edge of the funnel. In this manner, the strainer may be moved from an operable position within the funnel as shown in FIG. 5 and 6 to a raised inoperative position as shown in dotted lines of FIG. 6.

Located at the upper edge of the upper wall 34 of the strainer is a rigid circular flange 42. The flange functions to provide greater strength to the walls of the strainer. The flange 42 is of such size as to rest upon the upper edge of the funnel during operation and use.

All of the walls of the strainer are preferably fabricated of a mesh material. In this manner the oil or other fluid poured through the funnel will have any included larger particulate material strained from the fluid. In order to provide proper spacing between the strainer and funnel to effect proper straining, circular projections 46 are provided on the exterior surface of the walls of the strainer to maintain the strainer out of contact with the interior surface of the funnel.

Figure 7:
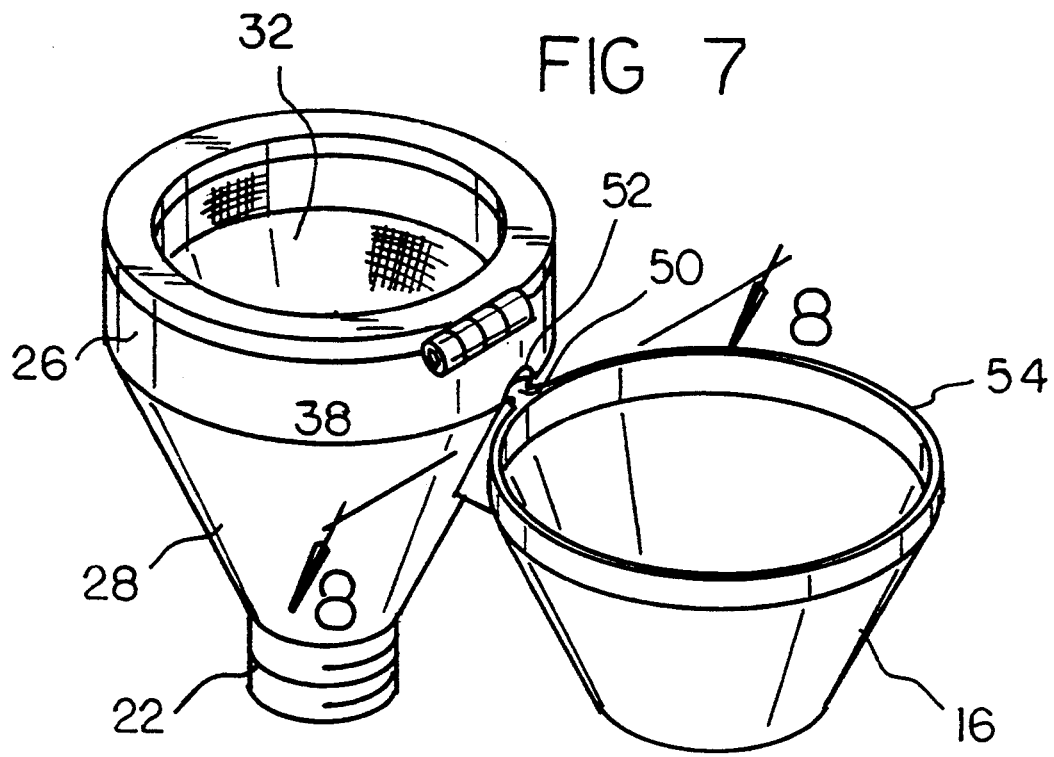
FIG. 7 is a perspective view of a filter for use with large drums constructed in accordance with another alternate embodiment of the invention.
Figure 8:
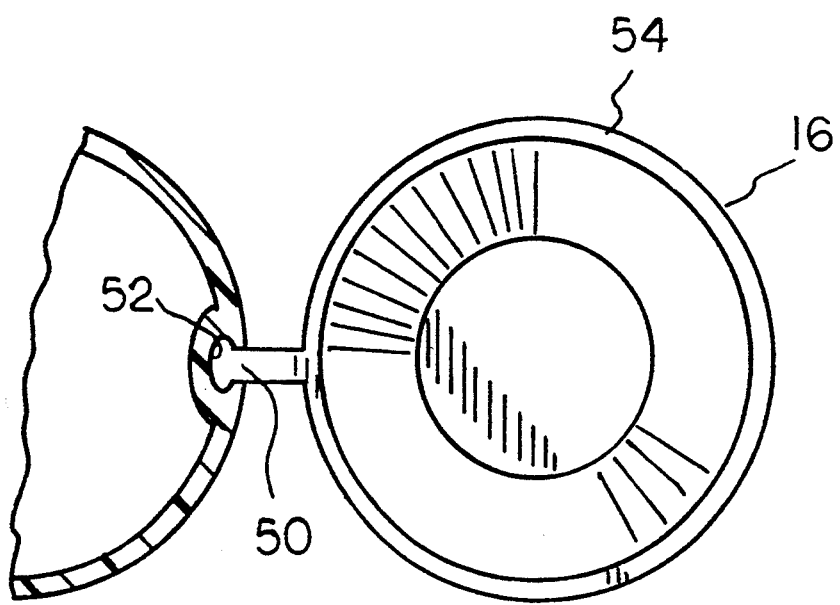
FIG. 8 is a sectional view of the filter for use with large drums of the prior Figure taken along line 8—8 of FIG. 7.

The last feature of the invention can be readily seen in FIGS. 7 and 8. Such last feature is the catch basin 16. The catch basin is simply an imperforate frustroconical member. Such container has a closed lower end and an open upper end. At one side of the upper edge is a mounting projection 50. Such mounting projection is adapted to be removably received in an associated recess 52 formed in the upper extent 26 of the funnel. The upper open edge 54 of the catch basin 16 is of a size substantially the same as the upper wall of the strainer.

In this manner, the strainer may be pivoted out of the funnel and any debris will be deposited under the influence of gravity directly into the catch basin for appropriate disposal.

The present invention is designed to maintain its position as liquids or powdered materials are poured through it with no need to hold it with the other hand or request assistance from a second party. It can be made from plastic or galvanized steel, and any embodiment would incorporate the same feature, namely, a threaded section at its lower tapered end. These threads are sized to mate with the standard threads used on the filling holes for thirty and fifty-five gallon drums.

From the foregoing description, the use of the present invention becomes fairly obvious. It is simply screwed into place when pouring any medium into one of these popularly sized drums. It will remain firmly in place and in an erect attitude with no further attention, and one may use both hands to lift and pour the contents of a source container without worrying about spillage due to cocking or movement of the funnel. The present invention may be made in all sizes required to accommodate various liquids and is equally functional as used to transfer dried chemicals, fertilizers and the like. It will be especially valuable to those involved in recycling efforts since a funnel is used frequently for this purpose, and these efforts are now universally practiced.

The present invention is simply fabricated, lends itself readily to high volume production and can be inexpensively manufactured.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus for pouring oil and other fluids into a large container comprising, in combination:

a funnel fabricated of a rigid material and having a lower extent of a cylindrical configuration with a small diameter and a limited height with external threads thereon, an upper extent of a cylindrical configuration with a large diameter and a limited height, and an intermediate extent of a frustroconical configuration extending between the upper extent and the lower extent, the upper and intermediate and lower extents having a common axis with the surface of the intermediate extent forming an angle of about 30 degrees with respect to the axis; and a strainer having a cylindrical upper wall positionable within the upper cylindrical extent of the funnel and equally spaced therefrom and a frustroconical lower wall forming an angle of about 30 degrees with respect to the axis and located within the upper portion of the intermediate frustroconical extent of the funnel and equally spaced therefrom and a circular wall therebeneath and a hinge coupling the upper edge of the strainer to the upper edge of the funnel, the wall being fabricated of a mesh material.

2. The apparatus as set forth in claim 1 and further including a catch basin removably positionable adjacent to the exterior surface of the funnel adjacent to its upper edge whereby the pivoting of the sieve out of the funnel will deposit debris therefrom into the catch basin.

* * * * *